US006189645B1

(12) United States Patent
Yoo

(10) Patent No.: US 6,189,645 B1
(45) Date of Patent: Feb. 20, 2001

(54) AUTOMOBILE AIR SUPPLY SYSTEM FOR PREVENTING SUDDEN ACCELERATION AND METHOD THEREOF

(75) Inventor: Jae-Woong Yoo, Seoul (KR)

(73) Assignees: Hyundai Motor Company, Seoul; Kia Motors Corporation, Kyungki-do, both of (JP)

( * ) Notice: Under 35 U.S.C. 154(b), the term of this patent shall be extended for 0 days.

(21) Appl. No.: 09/458,049

(22) Filed: Dec. 10, 1999

(30) Foreign Application Priority Data

Jul. 16, 1999 (KR) ........................ 99-28819

(51) Int. Cl.[7] ........................ B60R 21/00

(52) U.S. Cl. ........................ 180/271; 180/282

(58) Field of Search ........................ 180/271, 282, 180/283, 284, 285

(56) References Cited

U.S. PATENT DOCUMENTS 5,515,939 * 5/1996 Korall et al. ........................ 180/283
5,613,571 * 3/1997 Rank et al. ........................ 180/283

* cited by examiner

*Primary Examiner*—Kenneth R. Rice

(57) ABSTRACT

An air supply system of an automobile for preventing a sudden acceleration including an air cleaner, a throttle body having a throttle valve and connected to the air cleaner by air transfer duct, and a surge tank connected to the throttle body by an air transfer duct, wherein the air supply system further includes an intake air cutoff means provided between the throttle body and the surge tank for selectively cutting off an air flow from the throttle body to the surge tank, and a cutoff control means electrically connected to the intake air cutoff means for determining whether to cut off or not the intake air flow.

17 Claims, 5 Drawing Sheets

AUTOMOBILE AIR SUPPLY SYSTEM FOR PREVENTING SUDDEN ACCELERATION AND METHOD THEREOF

BACKGROUND OF THE INVENTION (a) Field of the Invention

The present invention relates to a air supply system of an automobile and methods employing thereof that are capable of preventing a vehicle from suddenly accelerating regardless of a driver's intention so as to secure a vehicle's stability and driver's safety.

(b) Description of the Related Art

Generally, an automatic torque converter comprises a torque converter, a gear train connected the torque converter for achieving a wide range of speeds and loads, and a hydraulic control system for selecting a necessary gear ratio by applying or releasing hydraulic pressure to or from desired friction elements.

Thus, in a vehicle equipped with an automatic transmission, gear shifting is performed by an electronic control unit (ECU), which sends electric control signals to a plurality of solenoid valves for controlling hydraulic flows, a medium for operating friction elements.

Recently, traffic accidents caused by sudden acceleration without relation to the driver's intention have been reported and one reason of these sudden accelerations is thought to be malfunctions of the solenoid valves caused by electromagnetic waves.

However, in a normal running state of the vehicle, such an uncontrolled sudden acceleration can not theoretically occur because the hydraulic flow control is ultimately performed by the driver's shift lever manipulation. Furthermore, even when there is a malfunction, the gear ratio is locked in third gear.

Other possible causes of uncontrolled accelerations of these vehicles are though to be as follows:

first, a speed range shift due to select lever manipulation while the accelerator is depressed;

second, a speed range shift when the idle revolutions per minute (rpm) of the engine is above normal due to an insufficient warm up of the engine;

third, a malfunction of the ECU caused by the driver's habitual tapping on the acceleration pedal, which temporarily increases the engine rpm;

and finally, a speed range shift that occurs if the vehicle is started without depressing the brake pedal, a situation in which the engine rpm increases temporally to compensate for the load generated during a speed range shift.

Recently, various technologies for preventing the vehicle's uncontrolled acceleration have been proposed. Most of the uncontrolled acceleration preventing technologies adapt a method for the analysis of the vehicle speed, the gear ratio of the transmission, and the engine rpm so as to adjust the engine performance if any unbalance is detected.

However, electrical analysis technologies for adjusting engine rpm use electrical circuit devices for detecting a failure. Hence, such devices are also susceptible to the effects of electromagnetic waves.

SUMMARY OF THE INVENTION

The present invention has been made in an effort to solve the above problems of the prior art.

It is an object of the present invention to provide an improved air supply system for preventing a sudden acceleration by stopping the engine when the vehicle starts with an abnormal rpm.

It is another object of the present invention to provide a method for preventing a sudden acceleration by cutting off air flow in the air supply system so as to stop the engine when the vehicle starts with an abnormal rpm.

To achieve the above first object, the air supply system of auto vehicle for preventing a sudden acceleration includes an air cleaner, a throttle body having a throttle valve and which is connected to the air cleaner by an air transfer duct, and a surge tank connected to the throttle body by an air transfer duct, wherein the air supply system further comprises an intake air cutoff means provided between the throttle body and the surge tank for selectively cutting off an air flow from the throttle body to the surge tank, and a cutoff control means electrically connected to the intake air cutoff means for determining whether to cut off or not the intake air flow.

To achieve the above second object, the method for preventing a sudden acceleration of auto vehicle comprises the steps of determining whether an engine is on or not; determining whether a present vehicle's condition corresponds to a sudden acceleration condition by calculating a present slip amount of a drive wheel and comparing the slip amount to a predetermined standard amount if the engine is on; and then stopping engine if the present vehicle condition corresponds to a sudden acceleration condition.

BRIEF DESCRIPTION OF THE DRAWINGS

The accompanying drawings, which are incorporated in and constitute a part of the specification, illustrate an embodiment of the invention, and, together with the description, serve to explain the principles of the invention; wherein.

DETAILED DESCRIPTION OF THE PREFERRED EMBODIMENTS

Preferred embodiments of the present invention will be described hereinafter with reference to the accompanying drawings.

Figure 1:
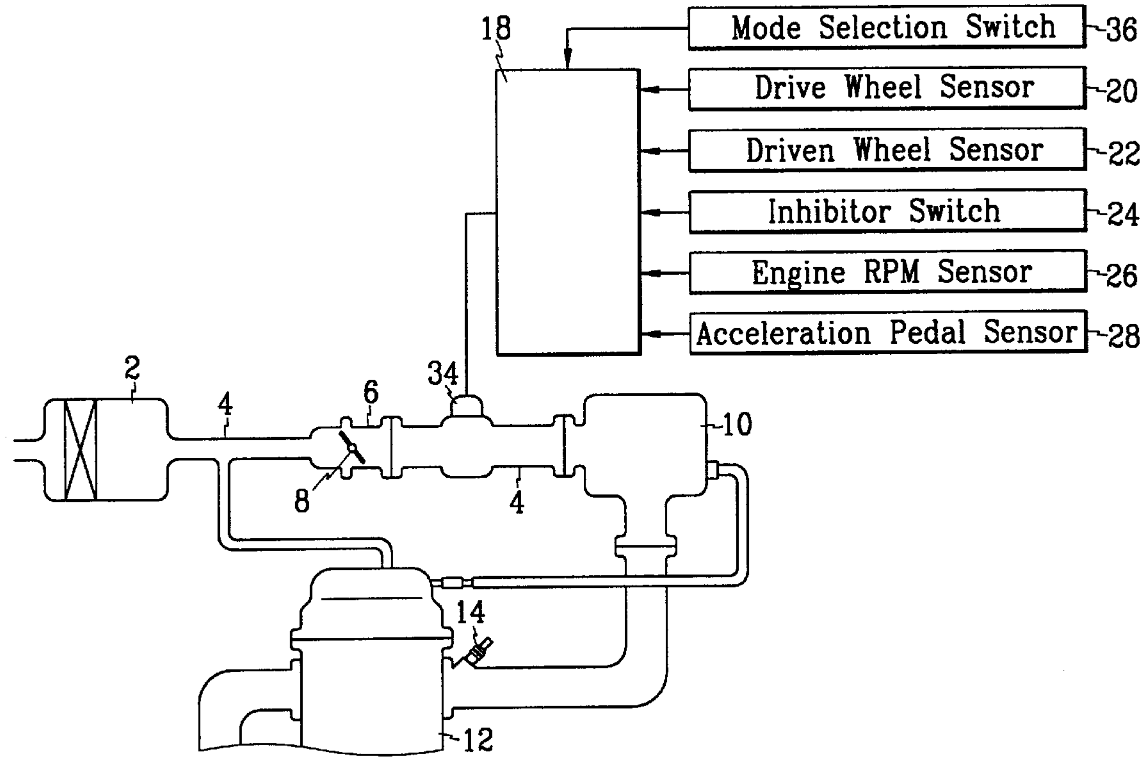
FIG. 1 is a schematic view showing an air supply system for preventing sudden acceleration according to the present invention.

FIG. 1 is a schematic view showing an air supply system of a vehicle for preventing sudden acceleration according to the preferred embodiment of the present invention. Because the air supply systems are well known in the art, the present description will be directed in particular to elements forming part of, or cooperating directly with, the air supply system in accordance with the present invention.

Incoming outside air passes through an air cleaner 2 for the filtering out of dirt and abrasives. The air cleaner 2 is connected to a throttle body 6 by an air transfer duct 4 such that an intake air amount is determined by a degree of opening of a throttle valve 8 in the throttle body 6. Consequently, the air passed through the throttle body 8 is temporally reserved in a surge tank 10 and then supplied to a combustion chamber of an engine 12.

Figure 2:
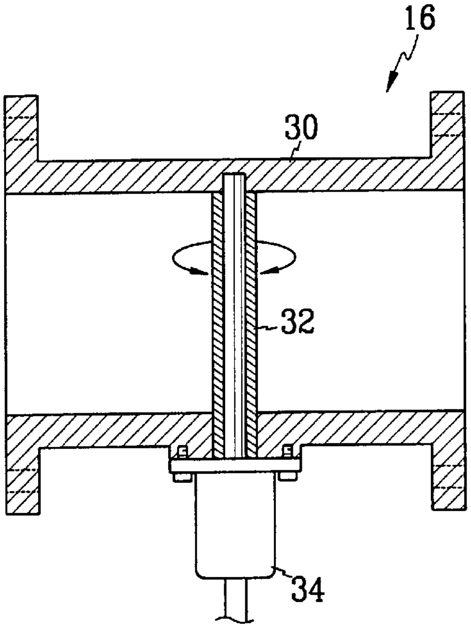
FIG. 2 is a cross sectional view of a shut-down valve adapted to the air supply system of FIG. 1.

In the present invention, a shut down valve 16 of FIG. 2 is provided between the throttle body 6 and surge tank 10 for controlling the intake air amount flowing into the surge tank 10.

The shut down valve 16 is electrically connected to a shut down control unit 18 such that the shut down control unit 18 controls the shut down valve 16 on the basis of parameters detected by a drive wheel sensor 20, a driven wheel sensor 22, an inhibitor switch 24 of the automobile transmission, an engine rpm sensor 26, and an acceleration pedal switch 28 according to an preset program in the shut down control unit 18.

Figure 3:
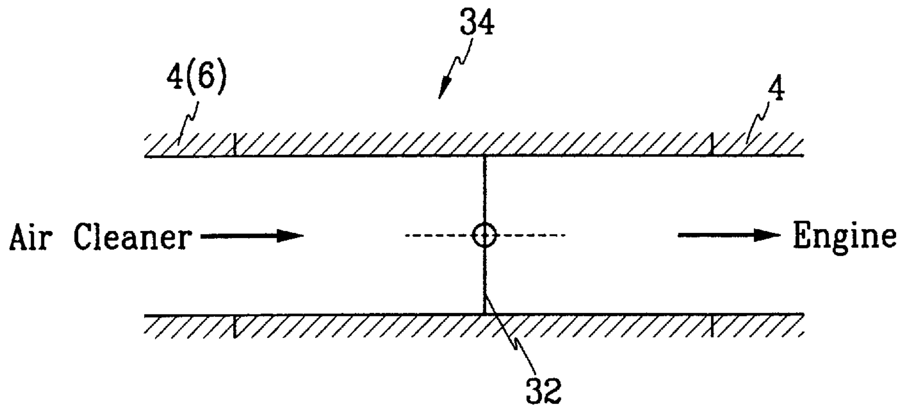
FIG. 3 is an operational view of the shutdown valve of FIG. 2.

As shown in FIG. 2 and FIG. 3, the shut down valve 16 includes a cylindrical casing 30 provided in the air transfer duct 4 between the throttle body 6 and the surge tank 10, a valve plate 32 installed in the casing 30 for selectively cutting off air flow from the throttle body 6 to the surge tank 10, and an actuator 34 connected to one end of a rotational shaft of the valve plate 32 for actuating the valve plate 32 according to a control signal from the shut down control unit 18.

The shut down valve 16 is designed in such a way that there is no gap between the valve plate 32 and inner surface of the cylindrical casing 30 when the valve is closed so that the air flow is completely shut.

The shut down control unit 18 performs shut down control independently of any electrical control unit.

In a first preferred embodiment of the present invention, the shut down control unit 18 uses data signals from the drive wheel sensor 20 and the driven wheel sensor 22 as parameters for controlling the shut down valve 16.

That is, the shut down control unit 18 compares the drive wheel rpm and the driven wheel rpm respectively detected by the drive wheel sensor 20 and the driven wheel sensor 22, and then determines whether or not to close the shut down valve 16 on the basis of a value obtain by subtracted the driven wheel rpm from the drive wheel rpm. If this value is greater than a predetermined value, the shut down control unit 18 sends a shut down signal to the actuator 34 for closing the shut down valve 16, resulting in the stopping of the engine.

However, this air supply shut down operation can bring about other problems in the situation when the vehicle needs great acceleration, for example when the vehicle is stuck in mud. For such cases a mode selection switch 36 must also be provided.

In second, third, and fourth embodiments of the present invention, the shut down control unit 18 further uses the data signals from an inhibitor switch 24, an engine rpm sensor 26, and a acceleration pedal switch 28 as parameters for much more accurately controlling the shut down valve 16.

A method for preventing the sudden acceleration according to the first preferred embodiment of the present invention will be described hereinafter with reference to FIG. 4.

Figure 4:
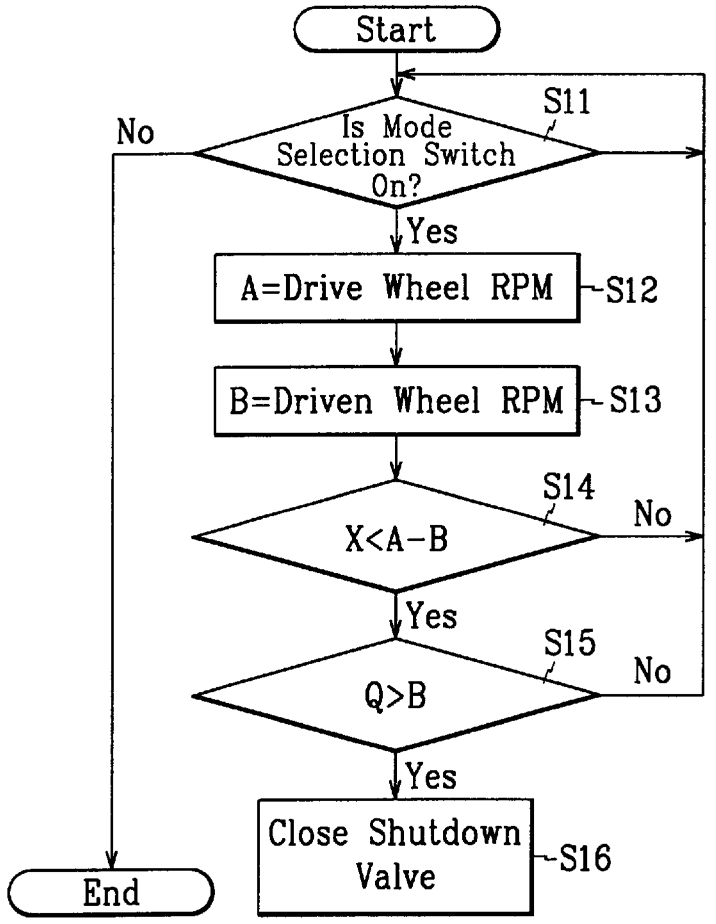
FIG. 4 is a flow chart showing an operating procedure of the air supply system of FIG. 1 according to a first preferred embodiment of the present invention.

As shown in FIG. 4, once the engine starts, the shut down control unit 18 determines whether the mode selection switch 36 is on or not in step S11. If the mode selection switch 36 is on, the shut down control unit 18 receives rpm data signals from the drive wheel sensor 20 and the driven wheel sensor 22 in steps S12 and S13. Consequently, the shut down control unit 18 calculates a comparison value by subtracting the driven wheel rpm B from the drive wheel rpm A and determines whether the remainder (A—B) is greater than the predetermined value X or not in step S14. If the remainder (A—B) is greater than the value X, the shut down control unit 18 determines whether a value Q representing an actual vehicle speed is greater than the driven wheel rpm B or not in step S15 (the speed of the vehicle Q is greater than that of the driven wheel in cases of sudden acceleration). If the value Q is greater than the driven wheel rpm B, the shut down control unit 18 sends the shut down signal to the actuator 34, which adjust the valve plate 32 such that the shut down valve is closed in step S16. Accordingly, the engine is shut down.

In this program flow path, steps S12 through S15 are the stages for determining if a case of sudden acceleration exist, and step 16 is the stage for stopping the engine.

In steps S14 and S15, if either condition is not satisfied, the program returns to the initial step S11.

A method for preventing the sudden acceleration according to the second preferred embodiment of the present invention will be described hereinafter with reference to FIG. 5.

Figure 5:
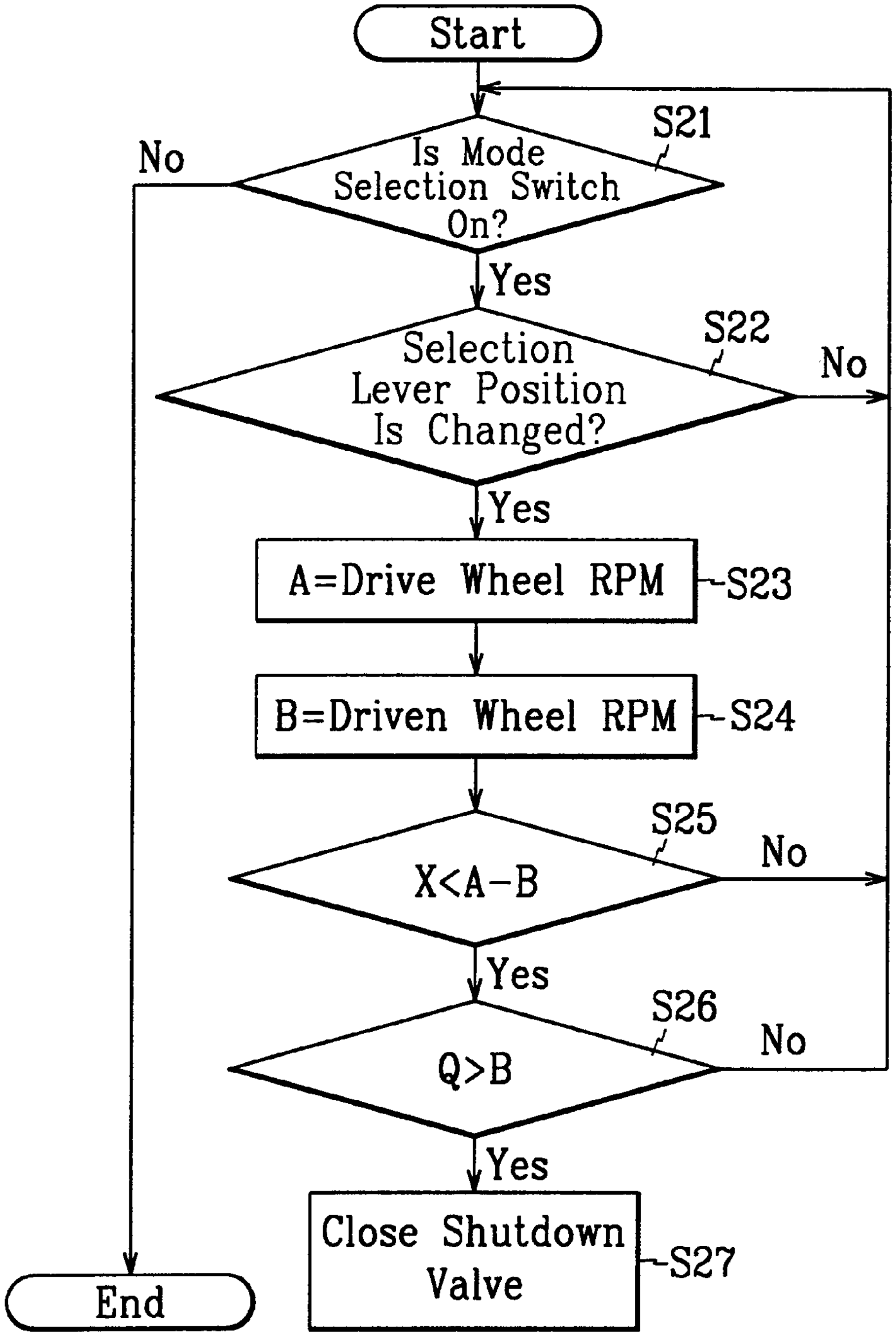
FIG. 5 is a flow chart showing an operating procedure of the air supply system of FIG. 1 according to a second preferred embodiment of the present invention.

As shown in FIG. 5, a step for determining whether a shift lever position has changed or not is further added between the step S11 and S12 of the first preferred embodiment. By adding the lever-position-change determination step S22, the shut down control unit 18 regards the change of the shift lever position as an indication of the driver's driving intentions such that the shut down control unit 18 does not execute the following steps of the program if the shift lever position has not changed. On the other hand, if the driver's driving intention is detected, the shut down control unit executes the following steps as in the first preferred embodiment.

Now, the method of the second embodiment will be explained in more detail.

As shown in FIG. 5, once the engine starts, the shut down control unit 18 determines whether the mode selection switch 36 is on or not in step S21. If the mode selection switch 36 is on, the shut down control unit 18 determines whether the shift lever position has changed or not on the basis of a signal from the inhibitor switch 24 in step S22. If the shift lever position has not changed, the program returns to the initial step S21, and if the shift lever position has changed, the shut down control unit 18 receives rpm data signals from the drive wheel sensor 20 and the driven wheel sensor 22 in the steps S23 and S24. Consequently, the shut down control unit 18 calculates a comparison value by subtracting the driven wheel rpm B from the drive wheel rpm A and determines whether the remainder (A—B) is greater than the predetermined value X or not in the step S25. If the remainder (A—B) is greater than the value X, the shut down control unit 18 determines whether the value Q representing actual vehicle speed is greater than the driven wheel rpm B or not in step S26. If the actual speed Q is greater than the driven wheel rpm B, the shut down control unit 18 sends the shut down signal to the actuator 34, which adjust the valve plate 32 such that the shut down valve is closed in step S27. Accordingly, the engine stops because of lack of intake air.

A method for preventing the sudden acceleration according to the third preferred embodiment of the present invention will be described hereinafter with reference to FIG. 6.

Figure 6:
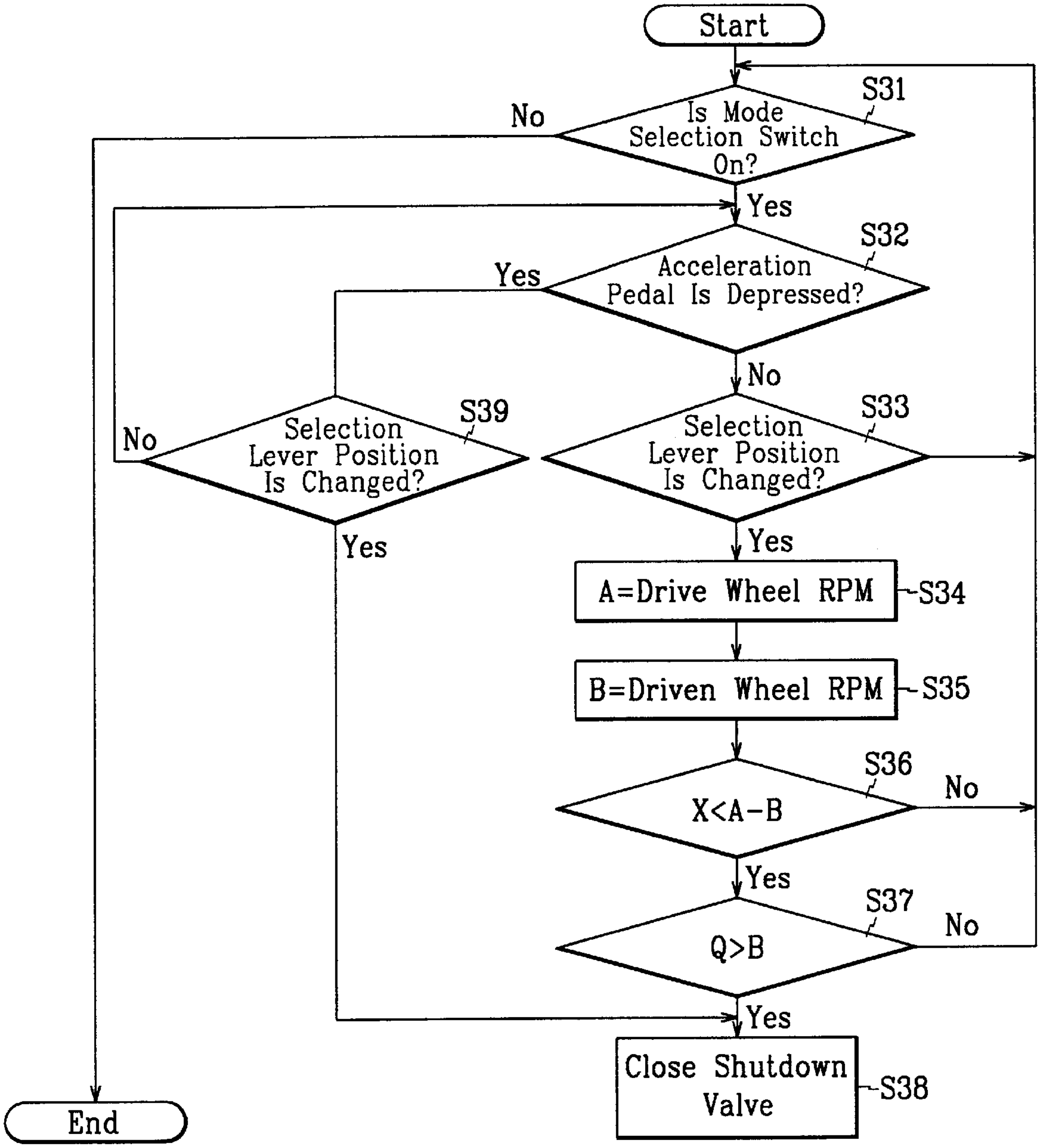
FIG. 6 is a flow chart showing an operating procedure of the air supply system of FIG. 1 according to a third preferred embodiment of the present invention.

As shown in FIG. 6, a step for determining whether an acceleration pedal is depressed or not is further added between the steps S21 and S22 of the second preferred embodiment. By adding the acceleration pedal depression determination step, if a gear range shift is performed while the acceleration pedal is depressed, the shut down control unit 18 regards this condition as a sudden acceleration condition.

Once the engine starts, the shut down control unit 18 determines whether the mode selection switch 36 is on or not in step S31. If the mode selection switch 36 is on, the shut down control unit 18 determines whether the acceleration pedal is depressed or not on the basis of a signal from the acceleration pedal switch 28 in step S32. If the acceleration pedal switch is off, the shut down control unit 18 determines if the shift lever position has changed or not on the basis of the signal from the inhibitor switch 24 in step S33. If the shift lever position has not changed, the program returns to the initial step S31. On the other hand, if the shift lever position is changed, the shut down control unit 18 receives rpm data signals from the driver wheel sensor 20 and the driven wheel sensor 22 in steps S34 and S35. Consequently, the shut down control unit 18 calculates a comparison value by subtracting the driven wheel rpm B from the drive wheel rpm A and determines whether the remainder (A—B) is greater than the predetermined value X or not in step S36. If the remainder (A—B) is greater than the value X, the shut down control unit 18 determines whether an value Q representing actual vehicle speed is greater than the driven wheel rpm B or not in step S37. If the actual speed Q is greater than the driven wheel, the shut down control unit 18 sends the shut down signal to the actuator 34, which adjust the valve plate 32 such that the shut valve is closed in step S38. Accordingly, the engine stops because of lack of intake air.

In the step S32, if the acceleration pedal is depressed, the shut down control unit 18 determines whether the shift lever position has changed or not in step S39. If the shift lever position has not changed, the program returns to the step S32. On the other hand, if the shift lever position has changed, the shut down control unit 18 sends the shut down signal to the actuator 34 such that the shut down valve is closed in the step S38.

A method for preventing the sudden acceleration according to the fourth preferred embodiment of the present invention will be described hereinafter with reference to FIG. 7.

Figure 7:
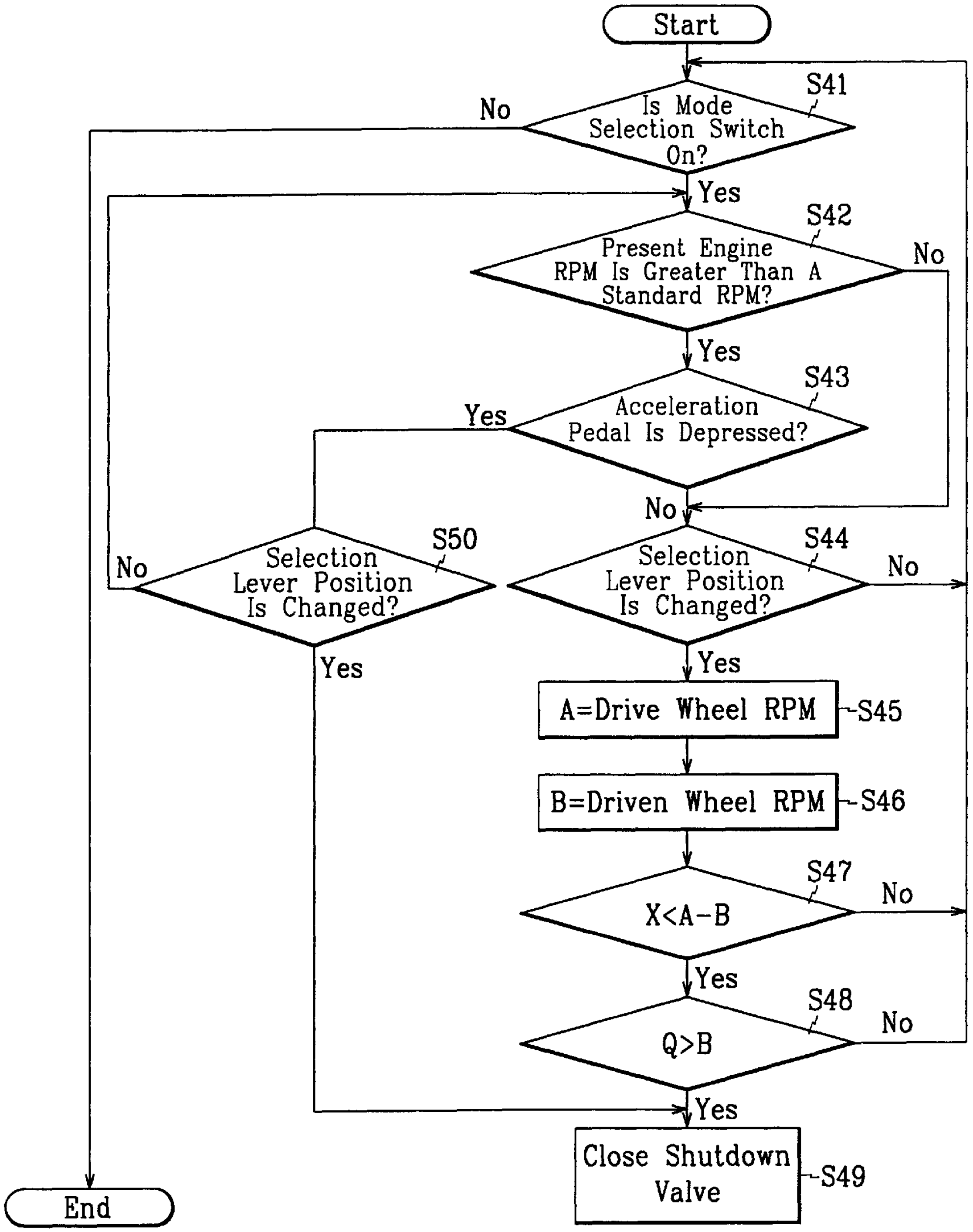
FIG. 7 is a flow chart showing an operating procedure of the air supply system of FIG. 1 according to a fourth preferred embodiment of the present invention.

As shown in FIG. 7, a step for determining whether a present engine rpm is normal is or not is further added between the steps S31 and S32 of the third preferred embodiment in order to much more accurately prevent sudden accelerations.

Once the engine starts, the shut down control unit 18 determines whether the mode selection switch 36 is on or not in step S41. If the mode selection switch 36 is on, the shut down control unit 18 determines whether the present engine rpm is greater than a predetermined standard rpm or not on the basis of an engine rpm signal from an engine rpm sensor 26 in step S42. If the present engine rpm is greater than the standard rpm, the shut down control unit 18 determines the acceleration pedal is depressed or not on the basis of the signal from the acceleration pedal switch 28 for determining whether the present engine rpm is caused by acceleration pedal depression or not in step S43. However, if the engine rpm is less than the standard rpm, the program jumps to step S44. If the acceleration pedal is not depressed in the step S43, the shut down control unit 18 determines whether the shift lever position has changed or not on the basis of the signal from the inhibitor switch 24 in step S44. If the shift lever position has not change, the program returns to the initial step S41, while on the other hand, if the shift lever position has changed, the shut down control unit 18 receives rpm data signals from the drive wheel sensor 20 and the driven wheel sensor 22 in steps S45 and S46. Then, the shut down control unit 18 calculates a comparison value by subtracting the driven wheel rpm B from the drive wheel rpm A and determines whether the remainder (A—B) is greater than the predetermined value X or not in step S47. If the remainder (A—B) is greater than the value X, the shut down control unit 18 determines whether an value Q representing actual vehicle speed is greater than the driven wheel rpm B or not in step S48. If the actual speed Q is greater than the driven wheel rpm B, the shut down control unit 18 sends the shut down signal to the actuator 34, which adjust the plate 32 such that the shut down valve is closed in step S49. Accordingly, the engine stops because of a lack of intake air.

In the step S43, if the acceleration pedal is depressed, the shut down control unit 18 determines whether the shift lever position has changed or not in step S50. If the shift lever position has not changed, the program returns to the step S43, while on the other hand, if the shift lever position has changed, the shut down control unit 18 sends the shut down signal to the actuator 34 such that the shut down valve is closed in step S49.

As described above, in the air supply system according to the present invention, since the shut down control unit monitors the vehicle's conditions and closes the shut down valve if the vehicle's condition is likely to cause a sudden acceleration, sudden accelerations can prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An air supply system of an automotive vehicle for preventing a sudden acceleration, comprising:

an air cleaner;

a throttle body having a throttle valve and connected to the air cleaner by air transfer duct;

a surge tank connected to the throttle body by an air transfer duct;

intake air cutoff means for selectively cutting off an air flow from the throttle body to the surge tank, the intake air cutoff means being provided between the throttle body and the surge tank; and a cutoff control means for determining whether to cut off or not the intake air flow electrically, the cutoff control means being connected to the intake air cutoff means.

2. An air supply system of claim 1 wherein the cutoff control means includes a mode selection switch for operating the cutoff control means by a driver's selection.

3. A air supply system of claim 1 wherein the intake air cutoff means comprises:

a cylindrical casing;

a valve plate installed in the casing and supported by a rotational shaft, both ends of the shaft being rotatably fixed on the cylindrical casing; and an actuator electrically connected to one end of the rotational shaft for actuating the valve plate.

4. An air supply system of claim 1 wherein the cutoff control means comprises a drive wheel sensor for detecting a drive wheel rpm and a driven wheel sensor for detecting a driven wheel rpm.

5. An air supply system of claim 4 wherein the cutoff control means further comprises an inhibitor switch of an auto transmission.

6. A air supply system of claim 4 wherein the cutoff control means further comprises the inhibitor switch of an auto transmission and a engine rpm sensor.

7. A air supply system of claim 4 wherein the cutoff control means further comprises the inhibitor switch of an auto transmission, an engine rpm sensor, and an acceleration pedal switch.

8. A method for preventing a sudden acceleration of auto vehicle comprising the steps of;

determining whether an engine is on or not;

determining whether a present vehicle's condition corresponds to a sudden acceleration condition by calculating a present slip amount of a drive wheel and comparing the slip amount to a predetermined standard amount, if the engine is on; and stopping the engine if the present vehicle condition corresponds to a sudden acceleration condition.

9. A method for preventing a sudden acceleration of claim 8 further comprising the step of operating the cutoff control means between the steps of determining whether an engine is on or not and determining whether a present vehicle condition corresponds to a sudden acceleration condition.

10. A method for preventing the sudden acceleration of claim 8 wherein the slip rate is obtained by subtracting a driven wheel rpm from drive wheel rpm.

11. A method for preventing the sudden acceleration of claim 8 further comprising the step of cutting off an air flow from a throttle body to a surge tank before the step of stopping the engine.

12. A method for preventing a sudden acceleration of an automotive vehicle comprising the steps of:

determining whether a mode selection switch is on or not, if engine is on;

receiving rpm data signal from a drive wheel sensor and a driven wheel sensor, if the mode selection switch is on;

determining whether a value obtained by subtracting driven wheel rpm B from drive wheel rpm A is greater than a predetermined standard value X or not, after receiving rpm data;

determining whether a revolution speed value Q representing vehicle's actual speed is greater than the driven wheel speed B, if the value obtained by subtracting driven wheel rpm B from the drive wheel rpm A is greater than the standard value X; and closing the intake air cut off means, if the value Q is greater than the driven wheel rpm B.

13. A method for preventing a sudden acceleration of an auto vehicle comprising the steps of:

determining whether a mode selection switch is on or not, if an engine is on;

determining whether a shift lever position has changed or not, if the mode selection switch is on;

receiving rpm data signal from a drive wheel sensor and a driven wheel sensor, if the shift lever position has changed;

determining whether a value obtained by subtracting driven wheel rpm B from drive wheel rpm A is greater than a predetermined standard value X or not, after receiving rpm data;

determining whether a revolution speed value Q is greater than the driven wheel rpm B, if the value obtained by subtracting driven wheel rpm B from the drive wheel rpm A is greater than the standard value X; and closing the intake air cut off means, if the revolution speed value Q is greater than the driven wheel rpm B.

14. A method for preventing a sudden acceleration of an automotive vehicle comprising the steps of:

determining whether a mode selection switch is on or not, if engine is on;

determining whether an acceleration pedal is depressed or not, if the mode selection switch is on;

determining whether the shift lever position has changed or not, if the acceleration pedal is not depressed;

receiving rpm data signals from a drive wheel sensor and a driven wheel sensor, if the shift lever position has changed;

determining whether a value obtained by subtracting driven wheel rpm B from drive wheel rpm A is greater than a predetermined standard value X or not, after receiving rpm data;

determining whether a revolution speed value Q representing vehicle's actual speed is greater than the driven wheel rpm B, if the value obtained by subtracting driven wheel rpm B from the drive wheel rpm A is greater than the standard value X; and closing the intake air cut off means, if the value Q is greater than the driven wheel rpm B.

15. A method for preventing a sudden acceleration of claim 14 wherein if the acceleration pedal is depressed and the shift lever position has changed, the intake air cutoff means is closed.

16. A method for preventing a sudden acceleration of an auto vehicle comprising the steps of:

determining whether a mode selection switch is on or not, if engine is on;

determining an acceleration pedal is depressed or not, if the mode selection switch is on;

determining a present engine rpm is greater than a predetermined standard rpm or not;

determining whether the acceleration pedal is depressed or not, if the engine rpm is greater than the predetermined rpm;

determining whether the shift lever position has changed or not, if the engine rpm is less than the predetermined rpm or the acceleration pedal is not depressed;

receiving rpm data signals from a drive wheel sensor and a driven wheel sensor, if the shift lever position is changed;

determining whether a value obtained by subtracting driven wheel rpm B from drive wheel rpm A is greater than a predetermined standard value X or not, after receiving rpm data;

determining whether a revolution speed value Q representing vehicle's actual speed is greater than the driven wheel rpm B, if the value obtained by subtracting driven wheel rpm B from the drive wheel rpm A is greater than the standard value X; and closing the intake air cut off means, if the revolution speed value Q representing vehicle's actual speed is greater than the driven wheel rpm B.

17. A method for preventing a sudden acceleration of claim 16 wherein if the acceleration pedal is depressed and the shift lever position has changed, the intake air cutoff means is closed.

* * * * *